(12) United States Patent
Lin et al.

(10) Patent No.: US 8,976,349 B2
(45) Date of Patent: Mar. 10, 2015

(54) METHOD OF MANUFACTURING PARTICLE-BASED IMAGE DISPLAY

(75) Inventors: Jui-Yu Lin, Taoyuan Hsien (TW); Jen-Ming Chang, Taoyuan Hsien (TW); Jiunn-Jye Hwang, Taoyuan Hsien (TW); Jung-Yang Juang, Taoyuan Hsien (TW); Ming-Hai Chang, Taoyuan Hsien (TW); Hao-Jan Wan, Taoyuan Hsien (TW)

(73) Assignee: Delta Electronics, Inc., Taoyuan (TW)

( * ) Notice: Subject to any disclaimer, the term of this patent is extended or adjusted under 35 U.S.C. 154(b) by 419 days.

(21) Appl. No.: 13/435,767

(22) Filed: Mar. 30, 2012

(65) Prior Publication Data
US 2013/0255054 A1 Oct. 3, 2013

(51) Int. Cl.
*G01N 21/00* (2006.01)
*G01N 21/47* (2006.01)
*G01N 21/88* (2006.01)

(52) U.S. Cl.
USPC ................................ 356/239.1; 356/237.2

(58) Field of Classification Search
USPC .............. 356/237.1–241.6, 242.1–243.8, 356/426–431, 600–640; 345/107; 359/296; 445/24
See application file for complete search history.

(56) References Cited

U.S. PATENT DOCUMENTS

| | | | | |
|---|---|---|---|---|
| 4,905,202 A * | 2/1990 | Robillard | .......................... | 367/8 |
| 5,504,601 A * | 4/1996 | Watanabe et al. | ................ | 349/42 |
| 5,959,713 A * | 9/1999 | Kobayashi | .................... | 349/192 |
| 6,215,896 B1 * | 4/2001 | Greig et al. | ................... | 382/149 |
| 6,529,837 B1 * | 3/2003 | Kang | ................. | 702/36 |
| 6,815,002 B2 * | 11/2004 | Kweon et al. | ................... | 427/58 |
| 6,919,003 B2 * | 7/2005 | Ikeda et al. | ................... | 204/490 |
| 7,112,114 B2 * | 9/2006 | Liang et al. | ..................... | 445/24 |
| 7,279,064 B2 * | 10/2007 | Daniel et al. | .................. | 156/295 |
| 7,292,213 B2 * | 11/2007 | Shen | ............................... | 345/89 |
| 7,298,446 B2 * | 11/2007 | Hou et al. | ..................... | 349/154 |
| 7,324,264 B2 * | 1/2008 | Aylward et al. | ............... | 359/296 |
| 7,412,088 B2 * | 8/2008 | Kuramata et al. | ............. | 382/141 |
| 7,495,819 B2 * | 2/2009 | Sakurai et al. | ................ | 359/296 |
| 7,597,925 B2 * | 10/2009 | Daniel | ............................. | 427/58 |
| 8,419,495 B2 * | 4/2013 | Liang et al. | ..................... | 445/24 |
| 8,470,150 B2 * | 6/2013 | Lee et al. | ...................... | 204/490 |
| 2001/0048416 A1 * | 12/2001 | Miyamoto et al. | .............. | 345/87 |
| 2002/0008898 A1 * | 1/2002 | Katase | ........................... | 359/296 |
| 2008/0158652 A1 * | 7/2008 | Toyoda | .......................... | 359/296 |
| 2009/0244688 A1 * | 10/2009 | Fujiwara et al. | .............. | 359/296 |

* cited by examiner

*Primary Examiner* — Kara E Geisel
*Assistant Examiner* — Jarreas C Underwood
(74) *Attorney, Agent, or Firm* — Muncy, Geissler, Olds & Lowe, P.C.

(57) ABSTRACT

A method of manufacturing a particle-based image display having a plurality of imaging cells is disclosed. The method includes filling the plurality of imaging cells with a plurality of first particles, identifying a defect associated with one or more of the imaging cells, and repairing the defect within a unit corresponding to part of the plurality of imaging cells.

5 Claims, 7 Drawing Sheets

METHOD OF MANUFACTURING PARTICLE-BASED IMAGE DISPLAY

BACKGROUND OF THE INVENTION

1. Field of the Invention

The present invention relates to a method of manufacturing a particle-based image display, and more particularly, to a method of inspecting and repairing defects in the manufacturing process.

2. Description of the Related Art

Particle-based image display (PBD) technology has drawn a great deal of attention by those skilled in display technology in recent years. Due to its wide viewing angles, low power consumption, light weight, and thinness, PBDs are widely applied in a variety of products such as electronic readers, electronic paper, electronic tags, electronic signage, and the like. PBDs are capable of providing visual effects which are similar to that of reading paper products. Different from backlight-type flat panel displays, PBDs utilize reflected ambient light from pigment particles to display content, and thus, there is no glare or other effects resulting from strong external light which affect comfortable reading. In addition, PBDs consume power only when the displayed contents are subjected to change.

A PBD includes a plurality of independently addressable display units spatially arranged in the form of a matrix. Each display unit is formed with a plurality of display cells, where each display cell is filled with pigment particles. Each display unit is disposed between a pair of opposing, spaced-apart substrates, and electrodes are disposed on at least one substrate. By applying voltages onto the electrodes, the charged pigment particles in the cells migrate by attraction to the respective electrodes having opposite polarities as a result of an electric field generated between the pair of substrates. Thus, the locations of the pigment particles can be controlled by changing the polarities of the electrodes, thereby displaying images of the reflected light from the pigment particles or fluid.

In FIG. 1A to FIG. 1C, a method of manufacturing a dry powder type particle-based image display 100 is shown. A plurality of rib structures 122 are first formed on a substrate 110 to define a plurality of imaging cells 120. A plurality of first particles 130 and second particles 140 are then filled into the plurality of imaging cells 120 sequentially. After that, the plurality of imaging cells 120 are sealed with a back panel 150 on which electrodes 160 are formed. Each imaging cell 120 is filled with the plurality of first particles 130 and the plurality of second particles 140 having different colors in contrast (e.g., black and white) and having charges with opposite polarities, respectively.

Thus, the floating state and the falling state of the different colored particles 130, 140 in the imaging cells 120 are controlled by varying external electric fields imposed on the pigment particles, thereby achieving color image displaying with coordination of a color filter. In addition, in order to overcome the slow response drawbacks of electrophoretic displays, the pigment particles 130, 140 in the dry powder type displays are selected to have better flowability and floodability. As such, the pigment particles have the characteristics of fluidity, and thus move fast when driven by an electric field. However, during the filling process, the pigment particles 130, 140 may be dispersed or spread all over the cells, i.e., wherein the pigment particles 130, 140 are not dispersed along a straight line even under the effect of the gravity. If the pigment particles 130, 140 are not uniformly filled, the display 100 would generate color deviation in color image displaying so that the yield rate of the display would be reduced. In addition, the black and white colored particles having charges with opposite polarities may easily aggregate together because of electrostatic attraction, which makes it difficult to fill the pigment particles into the imaging cells and affects the production yield. Lowering the charge density of the pigment particles may reduce the electrostatic attraction generating particle aggregation; however, it will reduce the sensitivity of the pigment particles to a driving electric field, which results in slow responses. Otherwise, the pigment particles would need to be driven with high voltages. Indeed, it presents a great challenge for the filling of the particles process to uniformly fill the black and white colored particles having charges of opposite polarities in each display cell. Thus, quality control for the uniformity of the filling of the particles plays an important role in the fabricating process of the particle-based image display.

In the conventional manufacturing process of PBDs, most quality control steps are performed after sealing the plurality of imaging cells. Thus, even though defects are inspected, there is no way for repair. For example, U.S. Pat. No. 7,843,621 discloses a test method for use in the production of an electro-optic display, in which the only suggestion after defect inspection is to record the locations of defective cells, so as to ensure that the units are not used in final products. Though JP200603918 discloses a method of manufacturing a particle-based display, which includes an optical defect inspection procedure before sealing the front panel, no corresponding action is suggested to deal with the defects.

Therefore, a heretofore unaddressed need exists in the art to address the aforementioned deficiencies and inadequacies.

BRIEF SUMMARY OF INVENTION

In one aspect of the present invention, a method of manufacturing a particle-based image display having a plurality of imaging cells is disclosed. The method includes filling the plurality of imaging cells with a plurality of first particles, identifying a defect associated with one of the imaging cells, and repairing the defect within a unit corresponding to part of the plurality of imaging cells.

According to another aspect of the present invention, a method of manufacturing a particle-based image display having a plurality of imaging cells is disclosed. The method includes filling the plurality of imaging cells with a plurality of first particles, irradiating the plurality of imaging cells with a plurality of polarized light beams, identifying one or more defects according to an intensity of a plurality of scattered light beams scattered by the plurality of first particles corresponding to each imaging cell, and repairing the one or more defects by removing at least part of the plurality of first particles, by filling with another plurality of first particles, or by removing foreign matter.

In yet another aspect of the present invention, a method for manufacturing a particle-based image display is disclosed. The method includes providing a substrate having a plurality of imaging cells, filling a plurality of first particles into each of the plurality of imaging cells, performing a first optical inspection to identify one or more first units, removing the first particles in the one or more first units, and refilling another plurality of first particles into the plurality of imaging cells located in the one or more first units.

These and other objectives of the present invention will become apparent to those of ordinary skills in the art after having read the following detailed description of the preferred embodiments which are illustrated in the various figures and drawings.

BRIEF DESCRIPTION OF DRAWINGS

The invention can be more fully understood by reading the subsequent detailed description and examples with references made to the accompanying drawings, where.

DETAILED DESCRIPTION OF INVENTION

The present invention provides a method of manufacturing a particle-based image display in which defect inspection and repair are performed for improving the yield rate of the filling of the particles and for reducing the manufacturing cost.

Figure 1A:
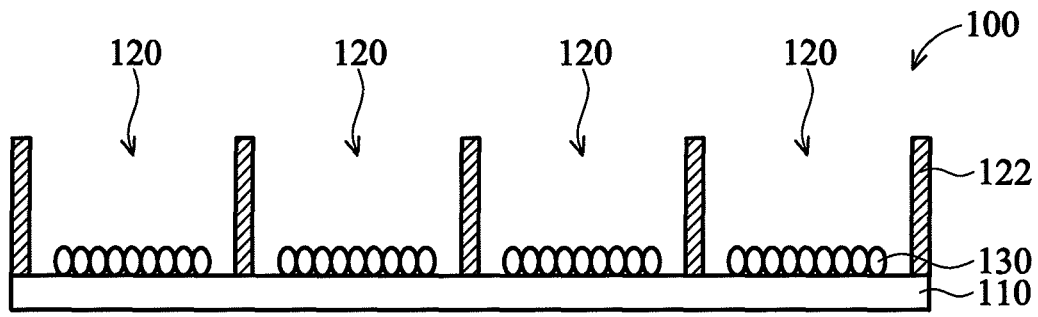
FIG. 1A to FIG. 1C are schematic diagrams illustrating a conventional method of manufacturing a particle-based image display.
Figure 1B:
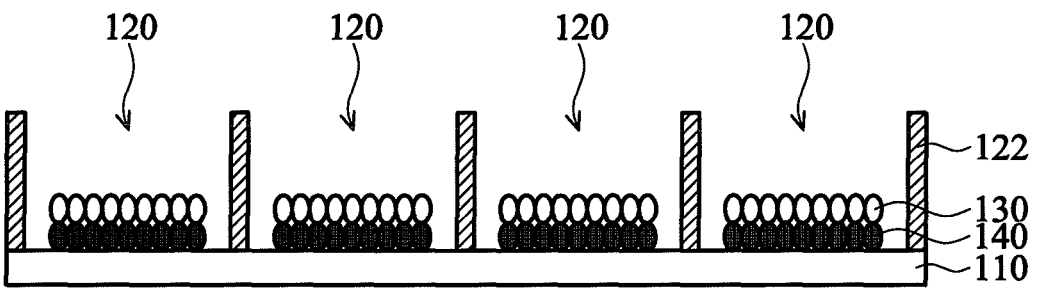
Figure 1C:
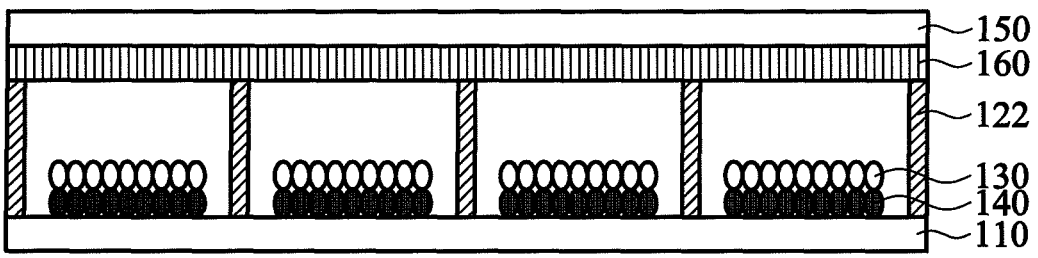
Figure 2:
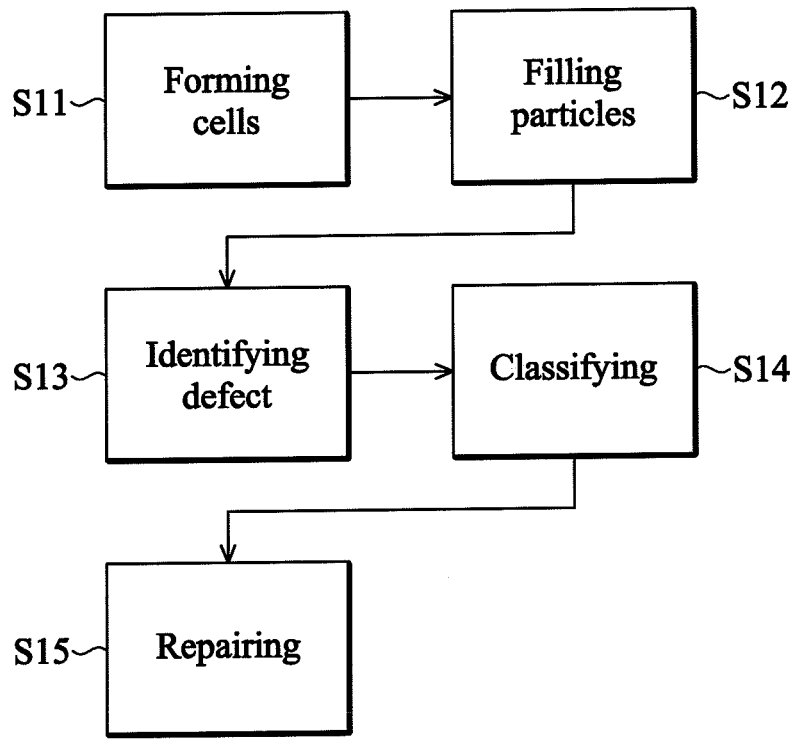
FIG. 2 and FIG. 3 show a method of manufacturing a particle-based image display according to a first embodiment of the present invention.

FIG. 2 shows a method of manufacturing a particle-based image display according to an embodiment of the present invention. A substrate is first provided, and a plurality of rib structures are formed on the substrate to form a plurality of imaging cells in step S11. After that, the plurality of imaging cells are filled with a plurality of first particles having a predetermined color in step S12. In step S13, a defect inspection is then followed to identify a defect occurring in an imaging cell, and a classifying step is further performed in step S14. After that, the defect associated with the imaging cell within a unit corresponding to part of the plurality of imaging cells is repaired in step S15.

In an embodiment of the present invention, a pre-filling method is used for the filling of the particles. In the pre-filling method, the plurality of first particles are first filled into a template having a plurality of compartments corresponding to the plurality of imaging cells. Each compartment has a suitable containment volume which is designed to contain a predetermined quantity of the plurality of first particles. After that, the template is mounted on the substrate. The plurality of first particles is then transferred from the plurality of compartments into the plurality of cells under influence of a field, such as a gravity field or an electric field.

Figure 3:
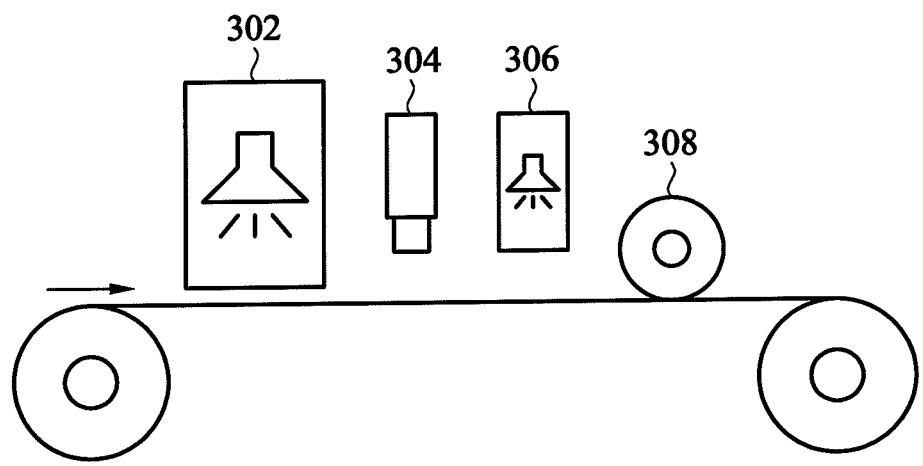

In an embodiment of the invention, the particle filling process, the defect inspection process, the defect repairing process and the packaging process can be proceed as a continuous procedure. For example, as shown in FIG. 3, the particle filling apparatus 302, the defect inspecting apparatus 304, the defect repairing apparatus 306 and the packaging apparatus 308 can be disposed in a continuous proceeding line to perform the particle filling process, the defect inspection process, the defect repairing process and the packaging process in a continuous way.

Figure 4:
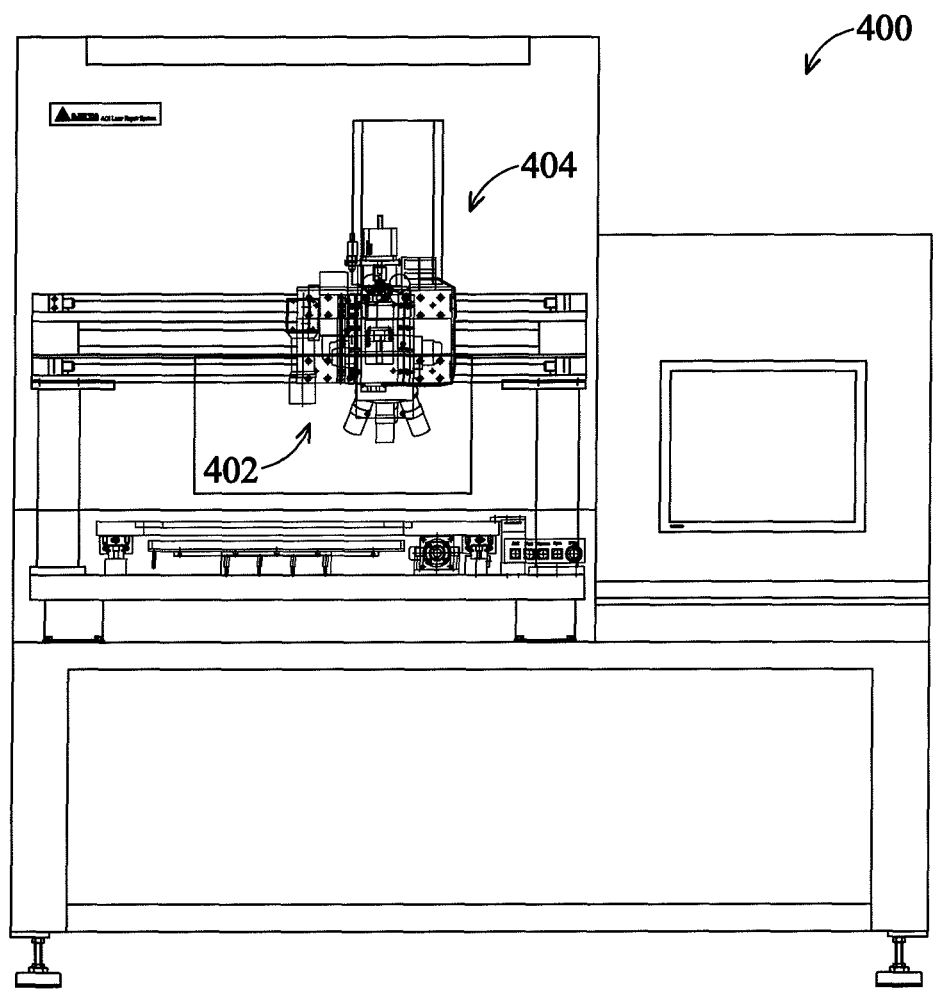
FIG. 4 is a schematic diagram of an AOI device utilized in an embodiment of the present invention.

According to the embodiment of the present invention, identifying a defect may be achieved by optically or acoustically inspecting the defect. In an embodiment of the present invention, identifying the defect is performed optically by an automatic optical inspection (AOI) machine. Referring to FIG. 4, an automatic optical inspection machine 400 is shown, which comprises an inspecting module 402 used for inspecting a defect of a particle-based image display and a laser repairing module 404 used for repairing the defect to increase yield of the display. Taiwan patent M317023 is incorporated herein by reference. In an embodiment of the invention, the repairing module can repair the defect by automatic mode or manual mode.

It is known that ultrasonic transducers can be used to generate high frequency sound waves. The distance to an object is determined by calculating a travel time between the sending of a signal and receiving of an echo. Therefore, a change in the travel time of ultrasonic waves associated with separate imaging cells relates to the variation of the filling volume of the particles in the plurality of imaging cells. The measured amplitude profile of the reflected echo at the interface between the particles and the transducer can be used to inspect the adequacy of the filling process. The variation of the ultrasonic attenuation coefficient in the particles filled may also relate to the porosity of particles in a given imaging cell. To reduce measurement distortion, however, the level of the particles accumulated is preferably flattened by, for example, a vibrator which is operably connected to the substrate.

Figure 5A:
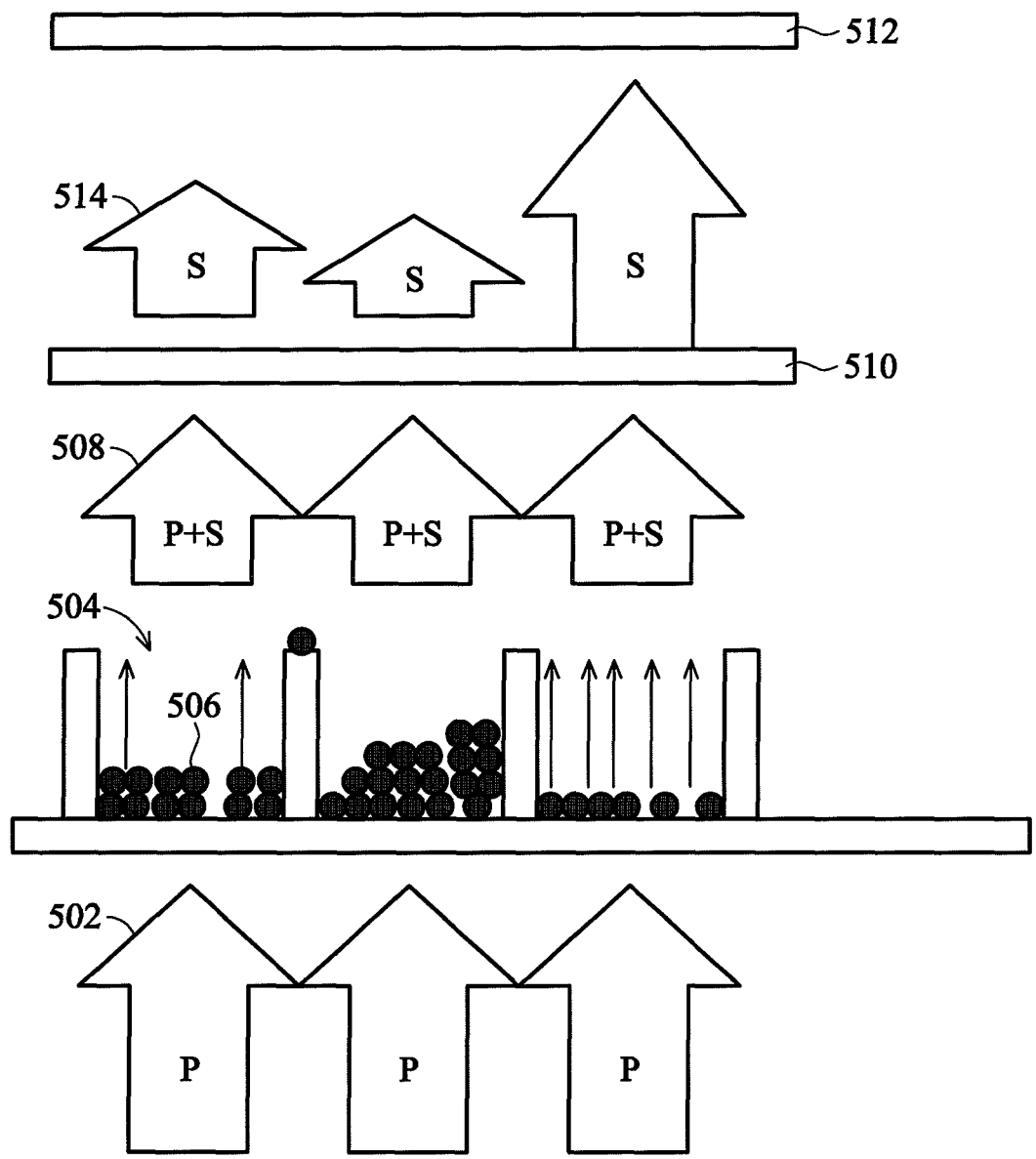
FIG. 5A is a schematic diagram of a method of defect inspection according to an embodiment of the present invention.

Referring to FIG. 5A, in an embodiment of the present invention, identifying a defect S13 is performed by irradiating the plurality of imaging cells with a plurality of polarized light beams 502. When the plurality of polarized light beams 502 pass through the plurality of imaging cells 504, part of the plurality of polarized light beams 502 are scattered by the plurality of first particles 506 to form a plurality of scattered light beams. Therefore, the light 508 passing the imaging cells 504 comprises partial polarized light and partial scattering light. In an embodiment, a suitable filter 510 is utilized to bypass the plurality of polarized light beams, wherein only scattered light beams 514 can pass the filter 510. An optical receiver 512 is used to receive the plurality of scattered light beams 514. The plurality of scattered light beams 514 are received and analyzed to identify one or more defects according to the intensity of the scattered light beams corresponding to each imaging cell.

Distribution of the plurality of first particles 506 in each imaging cell 504 can be obtained via the intensity of the scattered light beams 514 of each imaging cell 504. For example, when an imaging cell is overfilled with particles, it is difficult for the polarized light beams to pass through the plurality of first particles, leading to a relatively low intensity of scattered light beams when compared with those filled with a proper dosage. In the case of an insufficient amount of particles, most of the polarized light beams pass directly through without being scattered. This causes a relatively low intensity of scattered light beams. In other words, a suitable criterion can be made to screen defects out. In an embodiment of the present invention, a threshold value and a tolerance of the intensity are predetermined according to product requirement to identify defects.

If the method using the polarized light to irritate particles in the plurality of imaging cells of the display with a filter to bypass the polarized light is not applied, all the image cells except for those contained within the light spot are identified as black areas since the light spot presents much higher intensity. Thus, it is difficult to compare light intensity and contrast between imaging cells. On the contrary, the analyzing method of the embodiment of invention which inspects scattering light with polarized light being bypassed can more clearly identify the intensity of contrast between imaging cells to estimate the filling result of the particles in imaging cells.

In an embodiment of the present invention, the method further comprises flattening the plurality of first particles before identifying the defect. For example, a vibration mechanism such as supersonic/ultrasonic generator may be used to further disperse potential aggregations of the plurality of first particles so as to improve the reliability of defect inspection. In particular, the supersonic/ultrasonic mechanism may be used to provide momentary vibrations such that the plurality of first particles are flattened to facilitate the process of defect inspection.

In addition, if a pre-filling process is utilized in step S12, defect inspection and repair can be also performed in a similar way mentioned above to control a uniformity of the plurality of first particles distributed among the compartments of the template, thereby improving the uniform filling result of the particles.

Figure 5B:
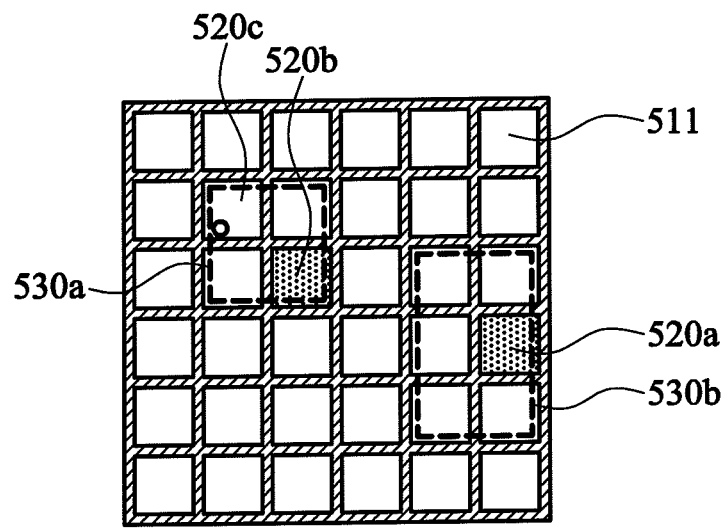
FIGS. 5B and 5C are schematic diagrams of a method of defect repair according to an embodiment of the present invention.

Referring to FIG. 5B, an exemplary inspecting result is shown. The intensity of scattered light beams of each cell is represented by a corresponding gray level to identify defects. According to the inspecting result, a defect analysis is then performed for classifying the defect into a corresponding defect type, such as insufficient filling of the plurality of first particles, overfill of the plurality of first particles, mura, occurrence of a foreign matter, occurrence of impurities or deformation of rib structures. As shown in FIG. 5B, defects in the three defective imaging cells 520a, 520b, and 520c are found among the plurality of imaging cells 511. A corresponding action may be taken to repair the defects. In an embodiment of the present invention, repairing the defect comprises removing at least part of the plurality of first particles, filling with another plurality of first particles, or removing a foreign matter or impurities. In an embodiment of the present invention, the plurality of first particles or foreign matter or impurities can be performed by a method such as vacuum suction, air blowing, voltage driving, or statistic driving.

In addition, if the repair is not efficient for some specific defect types, such as defective rib structures, the associated imaging cells are marked to avoid proceeding to a subsequent process. For example, a rework process may be performed for a substrate having defective rib structures instead of a repair process.

According to the present invention, the defects are preferably repaired on the basis of one or more units. Each unit is comprised of one or more adjoining imaging cells and has a predetermined unit corresponding to part of the plurality of imaging cells. The units in the present invention may have different sizes or shapes to meet fabrication process requirements. For example, the unit 530a is comprised four adjoining imaging cells and the unit 530b is comprised of six adjoining imaging cells. In an embodiment of the present invention, the AOI machine further comprises a computing module to determine a location of each unit according to the result of the defective imaging cells distribution to facilitate the repairing process.

Figure 5C:
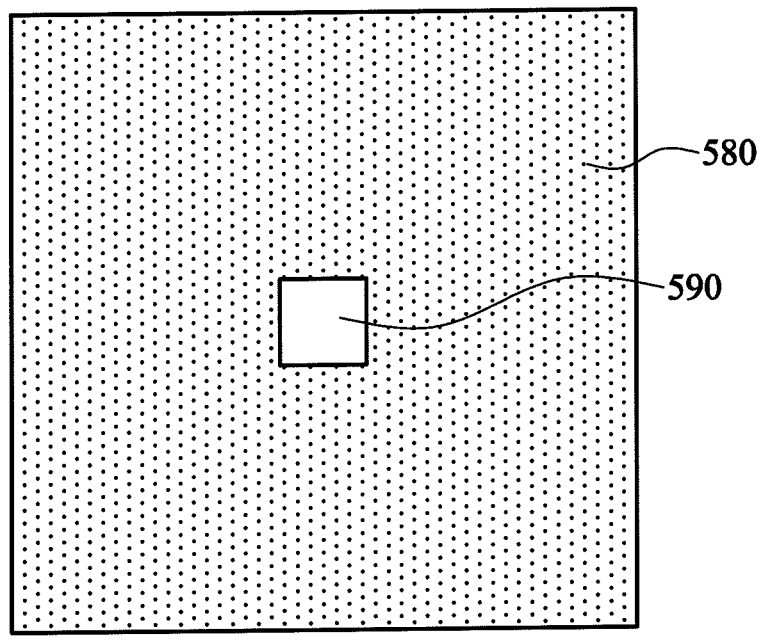

In an embodiment of the present invention, the AOI machine further comprises a repair module which can be moved onto a selected unit for repairing the plurality of imaging cells within the selected unit without influencing the other imaging cells outside of the selected unit. In addition, suitable equipment may be used optionally to further protect the plurality of imaging cells outside of the selected unit. Referring to FIG. 5C, a mask 580 having an opening 590 corresponding to the unit 530a or 530b is utilized in the process of repairing the defects according to an embodiment of the present invention. The mask 580 is first mounted on the front panel to cover all imaging cells except for the plurality of imaging cells in the unit 530a. After the defects within the unit 530a are repaired, the mask 580 is then moved to expose the unit 530b for repairing the defects within the unit 530b. After the repairing process is completed, another defect inspection may be carried out for confirming the repair result of the plurality of imaging cells within each unit.

Figure 6:
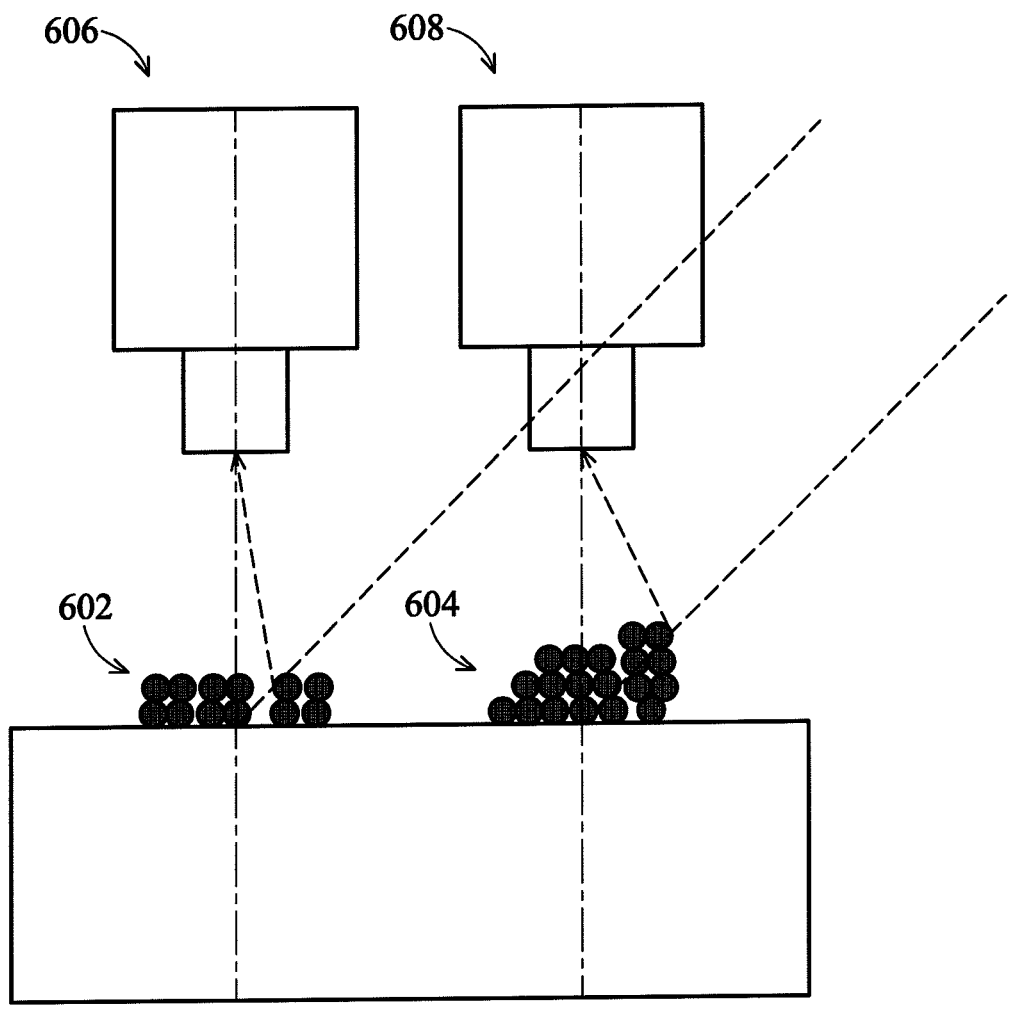
FIG. 6 is a schematic diagram showing a height identification method to obtain the filling of the particles conditions in the plurality of imaging cells.

The invention is not limited to the optical method to inspect the filling result of the particles in the plurality of imaging cells. Referring to FIG. 6, an embodiment of the invention can further use an intensity identifying method to obtain the filling result of the particles conditions in the plurality of imaging cells. As shown in FIG. 6, when the stack heights of the particles in the first cell 602 and the second cell 604 are different, the light presents different inlet angles, and the method can use image capture devices 606, 608, such as a CCD, to identify the difference to estimate the filling result of the particles conditions in the cells. Furthermore, the invention can also measure capacitance or inductance of the stack of particles filled in the plurality of imaging cells to estimate the filling result of the particles conditions.

After the defect inspection and repair of the plurality of first particles, the plurality of imaging cells are then filled with a plurality of second particles. Next, defect inspection and repair of the plurality of second particles can be carried out in a similar way to identify another defect associated with another imaging cell and to repair the another defect associated with the another imaging cell within another unit corresponding to part of the plurality of imaging cells.

It is noted that the plurality of first particles and the plurality of second particles tend to aggregate with each other. Thus, a rearrangement of the plurality of first particles and the plurality of second particles can be performed to improve the defect inspection after the plurality of second particles are filled in the plurality of imaging cells.

Figure 7:
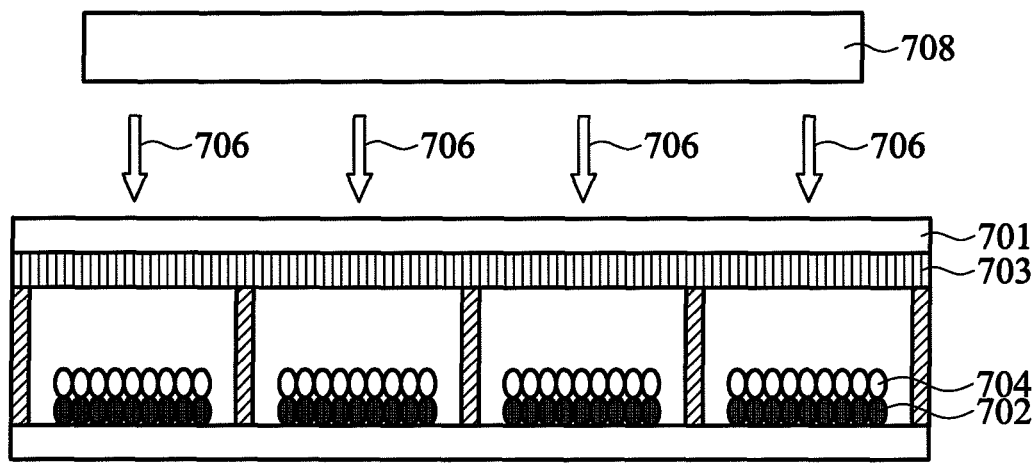
FIG. 7 is a schematic diagram of a method of defect inspection for the plurality of second particles according to an embodiment of the present invention.

Referring to FIG. 7 an exemplary embodiment of the rearrangement of the plurality of first particles and second particles is shown. In this embodiment, a transparent plate 701 with an electrode 703 formed thereon is used to cover the plurality of imaging cells temporarily. An external electric field is then applied thereon. Due to the different charge polarities, the plurality of first particles 702 and second particles 704 are driven toward different directions. As shown in FIG. 7, the plurality of first particles 702 which are black and have positive charge polarity are driven downward, and the plurality of second particles 704 which are white and have negative charge polarity are driven upward.

After that, an optical defect inspection for the plurality of second particles is carried out by irradiating a plurality of light beams 706 to the plurality of imaging cells through the transparent plate 701. The plurality of light beams 706 are reflected by the plurality of second particles 704 and then received by an optical receiver 708. Again, a defect analysis is performed according to the intensity of the plurality of reflected light beams for classifying defects into different defect types. Then, the defects can be repaired in a similar way as described above.

In addition, another inspection may be followed to confirm the repair. If the repair is satisfactory, the plurality of imaging cells are sealed and then combined with a back panel to form a particle-based image display.

Figure 8:
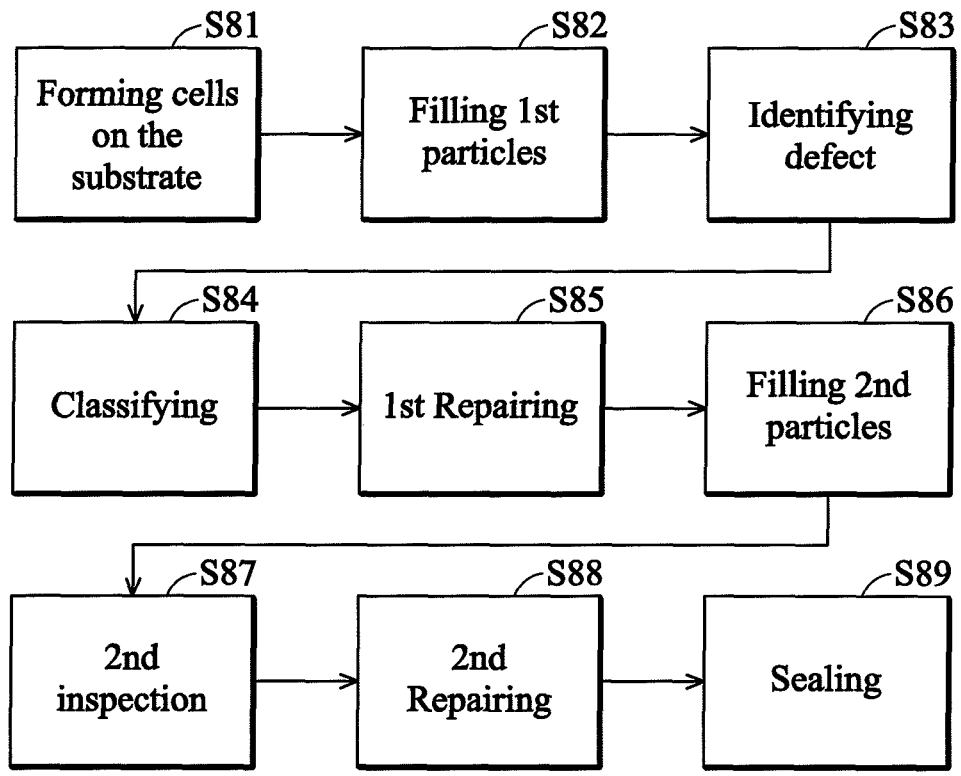
FIG. 8 is a flow chart of a method of manufacturing a particle-based image display according to a second embodiment of the present invention.

Referring to FIG. 8, a method of manufacturing a particle-based image display according to a second embodiment of the present invention is shown. First, as shown in the step S81, a substrate is provided and a plurality of imaging cells is formed on the substrate. Next, as shown in the step S82, a plurality of first particles are filled into each of the plurality of imaging cells. As shown in the step S83, a first optical inspection identifies one or more first unit. As aforementioned, polarized light beams and an AOI machine can be utilized to perform the first optical inspection. Each first unit has a predetermined number of adjoining imaging cells and comprises at least one first defective cell. As shown in the step S84, a defect analysis is then performed for classifying the defect into a corresponding defect type, such as insufficient filling of the plurality of first particles, overfill of the plurality of first particles, mura, occurrence of a foreign matter, occurrence of impurities or deformation of rib structures. As shown in the step S85, a first repairing is performed by removing the plurality of first particles in the one or more first units and by refilling another plurality of first particles into the plurality of imaging cells located in the one or more first units.

After that, as shown in the step S86, a plurality of second type particles are filled into each of the plurality of imaging cells subsequent to refilling with the another plurality of first type particles. As shown in the step S87, a second optical inspection is then performed to identify one or more second units. Each second unit has a predetermined number of adjoining imaging cells and comprises at least one second defective imaging cells. As shown in the step S88, a second repair is performed by removing the first type and second type particles in the second units and by refilling a plurality of first and second type particles into the plurality of imaging cells located within the one or more second units. As shown in the step S89, the plurality of imaging cells are sealed and then combined with a back panel to form a particle-based image display.

According to the present invention, one or more defects may be preferably identified before sealing the plurality of imaging cells and these defects may be repaired on a unit-by-unit basis in accordance with the defect types. According to the present invention, the degree of uniformity in the filling of the particles, which is a bottleneck in manufacturing particle-based image displays, can be improved, thereby effectively increasing the production yield and reducing costs.

While the present invention has been described by way of example and in terms of the preferred embodiments, it is to be understood that the present invention is not limited to the disclosed embodiments. It is intended to cover various modifications and similar arrangements. Therefore, the scope of the appended claims should be accorded the broadest interpretation so as to encompass all such modifications and similar arrangements.

What is claimed is:

1. A method for manufacturing a particle-based image display having a plurality of imaging cells, comprising:
    filling the plurality of imaging cells with a plurality of first particles;
    irradiating the plurality of imaging cells with a plurality of polarized light beams such that part of the plurality of polarized light beams are scattered by the plurality of first particles to form a plurality of scattered light beams;
    identifying one or more defects according to an intensity of the scattered light beams corresponding to each imaging cell; and
    repairing the one or more defects by removing at least part of the plurality of first particles, by filling with another plurality of first particles, or by removing foreign matter.

2. The method of claim 1, further comprising bypassing the plurality of polarized light beams.

3. A method for manufacturing a particle-based image display, comprising:
    providing a substrate having a plurality of imaging cells;
    filling a plurality of first particles into each of the plurality of imaging cells;
    performing a first optical inspection to identify one or more first units, wherein each first unit has a predetermined number of adjoining imaging cells and comprises at least one first defective imaging cell;
    removing the first particles in the one or more first units; and
    refilling the plurality of imaging cells located in the one or more first units with another plurality of first particles.

4. The method of claim 3 further comprising:
    filling each of the plurality of imaging cells with a plurality of second particles sequent to refilling with the another plurality of first particles;
    performing a second optical inspection to identify one or more second units, wherein each second unit has a predetermined number of adjoining imaging cells and comprises at least one second defective imaging cell;
    removing the first and second particles in the second units; and
    refilling the plurality of imaging cells located within the one or more second units with a plurality of first and second particles.

5. The method of claim 3 wherein performing the first optical inspection comprises:
    irradiating a plurality of polarized light beams toward each of the plurality of imaging cells respectively, wherein part of the polarized light beams are scattered by the plurality of first particles in each of the plurality of imaging cells so as to form a plurality of scattered light beams; and
    identifying the first defective imaging cells according to an intensity of the scattered light beams corresponding to each of the plurality of imaging cells.

* * * * *